United States Patent
Hetrick et al.

(10) Patent No.: US 11,056,936 B2
(45) Date of Patent: Jul. 6, 2021

(54) ELECTRIC MOTOR AND CONSTRUCTION METHODS THEREOF

(71) Applicant: Ford Global Technologies, LLC, Dearborn, MI (US)

(72) Inventors: Joel Hetrick, Ann Arbor, MI (US); Jacob Krizan, Farmington Hills, MI (US); Cyrille Goldstein, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 16/383,843

(22) Filed: Apr. 15, 2019

(65) Prior Publication Data

US 2020/0328637 A1  Oct. 15, 2020

(51) Int. Cl.
 *H02K 1/27* (2006.01)
 *H02K 1/18* (2006.01)
 *H02K 1/16* (2006.01)

(52) U.S. Cl.
 CPC .............. *H02K 1/274* (2013.01); *H02K 1/18* (2013.01); *H02K 1/16* (2013.01); *H02K 2201/06* (2013.01); *H02K 2201/09* (2013.01)

(58) Field of Classification Search
 CPC  H02K 1/274; H02K 1/18; H02K 1/16; H02K 2201/09; H02K 2201/06
 USPC .................................................. 310/51, 89
 See application file for complete search history.

(56) References Cited

U.S. PATENT DOCUMENTS

| | | | |
|---|---|---|---|
| 3,445,702 A * | 5/1969 | Silva | H02K 1/185 310/191 |
| 5,894,182 A | 4/1999 | Saban et al. | |
| 5,982,131 A * | 11/1999 | Aino | H02K 5/26 318/646 |
| 6,717,315 B1 | 4/2004 | Tajima et al. | |
| 6,798,094 B2 * | 9/2004 | Hirsou | H02K 5/15 310/51 |
| 7,129,608 B2 * | 10/2006 | Eppler | H02K 1/148 310/89 |
| 7,538,468 B2 * | 5/2009 | Kobayashi | H02K 1/185 310/216.049 |
| 10,336,299 B2 * | 7/2019 | Kojima | H02K 1/185 |
| 10,707,718 B2 * | 7/2020 | McGrew, Jr. | B60L 50/60 |
| 2002/0079777 A1 | 6/2002 | Sirois | |
| 2007/0210669 A1 * | 9/2007 | Fukasaku | H02K 1/185 310/216.023 |
| 2014/0117806 A1 * | 5/2014 | Jaganjac | H02K 1/18 310/216.058 |
| 2020/0328637 A1 * | 10/2020 | Hetrick | H02K 1/18 |

* cited by examiner

*Primary Examiner* — John K Kim
(74) *Attorney, Agent, or Firm* — David B. Kelley; Brooks Kushman P.C.

(57) ABSTRACT

An electric machine includes an outer housing and a stator secured to the outer housing and configured to induce an electromagnetic field. The electric machine also includes a rotor configured to output rotational movement in response to the electromagnetic field of the stator. The electric machine further includes at least one retention key configured to cooperate with a retention feature of the stator to engage a channel of the outer hosing to generate a circumferential force to resist movement of the stator relative to the housing.

10 Claims, 3 Drawing Sheets

ELECTRIC MOTOR AND CONSTRUCTION METHODS THEREOF

TECHNICAL FIELD

The present disclosure relates to an electric motor and construction methods thereof.

INTRODUCTION

Electric machines (i.e., motor/generators) may include a stator secured to an outer housing. Differences in material between the stator and outer housing may affect electrical loss of the machine, as well as present assembly challenges. Moreover, certain types of interference fit constructions may be more sensitive to effects of differences in thermal expansion between the various materials. Further certain interference fit constructions may induce undue stresses during assembly.

SUMMARY

An electric machine includes an outer housing and a stator secured to the outer housing and configured to induce an electromagnetic field. The electric machine also includes a rotor configured to output rotational movement in response to the electromagnetic field of the stator. The electric machine further includes at least one retention key configured to cooperate with a retention feature of the stator to engage a channel of the outer hosing to generate a circumferential force to resist movement of the stator relative to the housing.

An electric machine includes a rotor configured to output rotational movement in response to an electromagnetic field and a stator disposed about the rotor and configured to induce the electromagnetic field in response to a supplied power. The stator includes at least one radially-extending retention feature. The electric machine also includes a housing configured to secure the stator, wherein the housing includes a channel to receive the at least one retention feature. The electric machine further includes a retention key configured to cause the at least one retention feature to engage opposing side walls of the channel to restrict movement of the stator.

A method of constructing an electric machine includes providing an outer housing having a central opening to receive a stator, the central opening defining at least one channel. The method also includes aligning at least one retention feature of the stator with the channel. The methos further includes longitudinally inserting the stator into the central opening during an initial state of assembly. The method further includes aligning at least one retention key within the channel to engage the retention feature and at least one side wall of the channel to generate a circumferential force to restrict movement of the stator relative to the outer housing.

DETAILED DESCRIPTION

Figure 1:
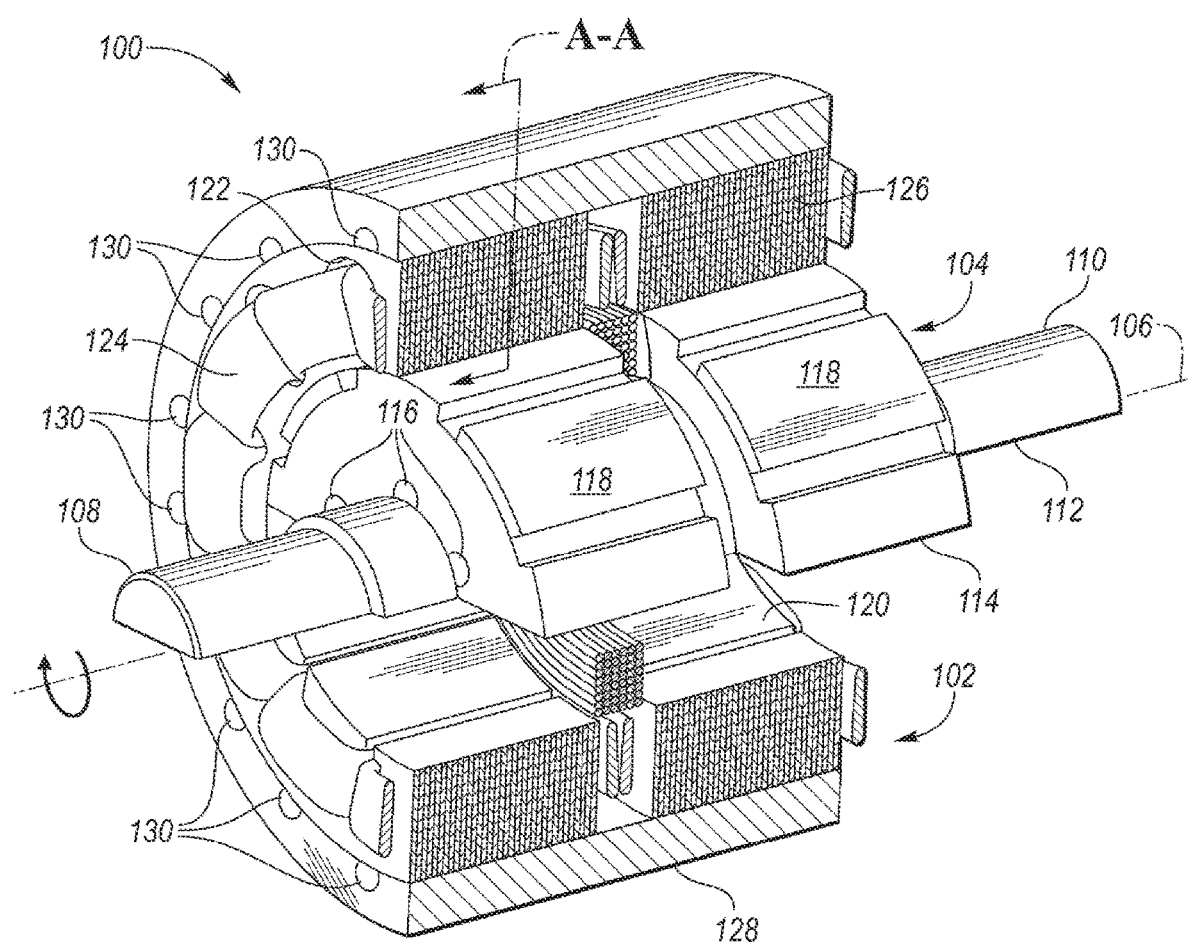
FIG. 1 is a perspective cutaway view of an electric motor.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In vehicles having one or more electrified propulsion sources, an electric motor may be connected at any of various points along a driveline to output torque to one or more traction wheels to propel the vehicle. Such an electric motor may supplement output torque of an engine when running, propel the vehicle solely using electrical power while the engine is deactivated, operate as a starter motor to provide a rapid wind-up for engine cranking, and operate as a generator to provide electrical power from the application of a resistive torque, for example during regenerative braking. In other example vehicles without an engine, the one or more electric motors may serve as the sole propulsion source for the vehicle at all times.

During assembly of an electric motor, a stator may be assembled to an outer housing. According to some examples provided herein, at least one locking tab is provided to secure the position of the stator and transmit radial tension, circumferential compression loads, as well as torsional loads. In some examples, the stator is secured via an interference fit to the housing while accommodating thermal expansion differences between the stator core (e.g., electrical steel) and the outer housing (e.g., aluminum). Such an arrangement may avoid traditional shrink-fit methods which result in higher motor losses due to the change in electrical steel loss behavior under compressive stress.

The methods of constructing the electric motor described in more detail below allow the stator to be inserted into the housing without interference during an initial state of assembly. Then, various methods are disclosed to effectively expand or deflect one or more retention features to create interference to the housing during a subsequent state of assembly. Thus, the stator may be initially inserted with clearance and a subsequent expansion of the tabs avoids excessive compressive stress which can increase stator core loss (i.e., reduce motor efficiency). Since the stator-housing joint may rely on the interference mating condition, retention features of the stator are unable to move relative to the housing. The construction methods disclosed herein may also be applicable to a rotor core-to-shaft interface to allow a secure joint with cost-efficient manufacture and subsequent resolver shift elimination.

Referring to FIG. 1 a perspective view of a cutaway portion of an electric motor 100 depicts its internal construction. The electric motor 100 includes a stator 102 and a rotor 104. The stator 102 is generally cylindrical in shape, and defines a hollow central portion to receive the rotor 104. The stator 102 is depicted as a half cutaway along a vertical plane aligned with a center line axis 106. Similarly, the rotor 104 is also depicted as a half cutaway, along a plane rotated about 90 degrees with respect to the stator 102 such that the cutaway plane is horizontal and aligned with the center line axis 106. The rotor 104 is configured to rotate about the center line axis 106 and provide torque output to either a first end 108 and/or a second end 110 of an output shaft 112. The rotor 104 includes a core portion 114 affixed to the output shaft 112. The core portion may define shaft interfacing features near the axis of rotation 106. The shaft interfacing features engage the output shaft 112 of the motor for transferring torque between the motor 100 and any of a number of driveline components depending on the particular powertrain topology. In the example of FIG. 1, plurality of retention features 116 are arranged to secure the core portion 114 to the shaft 112. Discussed in more detail below, the core portion 114 may be assembled to the shaft 112 by inserting translating the shaft along an axial direction parallel to the central axis 106. The shaft interfacing portion 216 is depicted as generally round, but alternative shapes may be employed such as asymmetric openings and/or keyed features to transfer torque between the rotor 202 and an output shaft.

The core portion 114 of the rotor 104 may also include a plurality of permanent magnets 118 configured to react to electromagnetic fields generated by the stator 102 and cause movement of the rotor 104. The plurality of permanent magnets 118 may be formed from a type of iron-based alloy, such as neodymium, and cooperate to generate a magnetic field to interact with the stator 102 when energized. In the example of FIG. 1, each of the permanent magnets 118 is depicted as having a rectangular shape to enhance simplicity and reduce manufacturing costs. However, other magnet shapes may be suitable according to the present disclosure.

The stator 102 includes a core 120 that defines a number of slots 122 shaped to receive windings 124 which are in electrical connection to a power source (not shown). The windings 124 are provided to wrap about each of the slots 122 and are configured to generate a rotating magnetic field within the stator 102. The windings 124 are referred to collectively when unnecessary to distinguish particular individual windings from one another. The windings 124 are depicted as a single block in the example of FIG. 1, however each block represents a group of loops, or turns, of individual conducting wire strands. The wire stands may be basic cylindrical copper wire having gaps between each wire limiting the fill efficiency of the windings filling the area of each slot 122. Alternatively, wire strands may be pressed together or have alternatively-shaped cross sections to reduce gaps and improve the fill efficiency of the windings looped within slots 122.

When the windings 124 are energized, the electromagnetic fields generated urge movement of the permanent magnets 118. The core 120 is constructed from a plurality of layers or laminations 126, rather than a large, solid piece. The laminations 126 are stacked in an axial direction along the axis of rotation where the lamination stack defines an active length of the electric motor 100. Generally, the thinner laminations 126 have a higher electical resistance than one solid piece, and therefore, may produce less eddy currents and thus experience lower associated current loss. Each of the plurality of laminations 126 may be assembled within an outer housing 128. While depicted as having a simple cylinder shape in the example of FIG. 1, the housing 128 may include a number of external features through which to mount the electric motor 100, secure connections to other components, and/or facilitate torque delivery mechanisms to the vehicle driveline.

The laminations 126 may be secured to the housing 128 via one or more retention features 130. According to some examples, the laminations 126 are assembled by insertion into an open center portion of the housing 128 along a direction of the central axis 106.

Torque from the motor 100 may be passed through one or more driveline components before being delivered to vehicle traction wheels.

As discussed above, the electric motor 100 may operate as a generator by receiving torque from the engine or other driveline components, for example during regenerative braking, and deliver power to a traction battery. In other modes, the electric motor 100 may receive power from the traction battery and output propulsion torque via shaft 112. In some examples, the motor 100 may include an integral gearbox to alter the gear ratio of torque ultimately output to the vehicle driveline.

The electric motor 100 is a reversible electric machine capable of both converting mechanical shaft power into electrical power, and capable of converting electrical power into mechanical shaft power. The motor 100 includes a two-way electrical connection configured to receive energy from the battery to provide a propulsion torque. The two-way connection also allows energy to be passed to the battery for storage. For example, electrical energy generated from torque absorbed by the electric motor 100 can be transferred to the battery through the two-way electrical connections.

The electric machine 100 is driven when a number of the windings 124 are sequentially powered to create a rotating electromagnetic field. According to some examples, the motor 100 may include a circuit to convert high-voltage direct current into three-phase alternating current to operate the motor 100. The motor circuit may also include Hall sensors to detect the angular position and speed of the rotor 104. Pulse width modulation (PWM) may be used to open and close each of a plurality of switches to simulate an alternating current on each of multiple winding circuits.

The retention features 130 of the stator 102, as well as the retention features 116 of the rotor 104 may have various configurations to generate an interference fit to secure the components to each other. Simple interference fits can be used to secure the components to each other. According to some examples, a press-fit joint of the rotor 104 may be created by forcing the retention features 116 into undersized openings spaced around a hub opening of the core portion 114. Such an assembly method may create assembly difficulties related to the required assembly forces, as well as the stresses created in the components relative to ultimate strength. For example, if the electric motor 100 is to be operated over a wide temperature range, use of an interference fit may limit the choice of materials for housing 128 to those with coefficients of thermal expansion (CTE) that match the material of the laminations 126. Another potential drawback regarding the press press-fit assembly method is that burrs can be created during assembly which have the potential to become slivers of metal that can lodge into windings and cause electrical failures. Further, the individual layers of the lamination stack may crack or split if the pressing direction controlled imprecisely and the stack is not inserted perpendicular to the bore of the housing 128.

According to some examples, the configurations of the retention features allow for assembly of the relative components with a clearance fit, then generation of an interference fit once the components are positioned relative to each other.

Figure 2A:
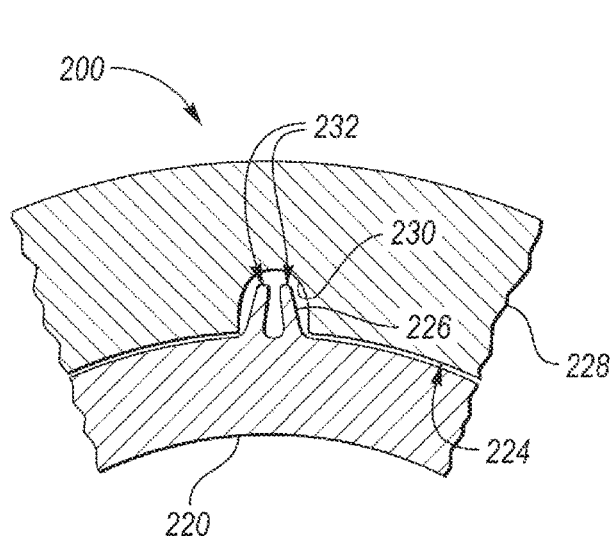
FIG. 2A is a cross section along line A-A through a first example stator and housing segment while partially assembled.
Figure 2B:
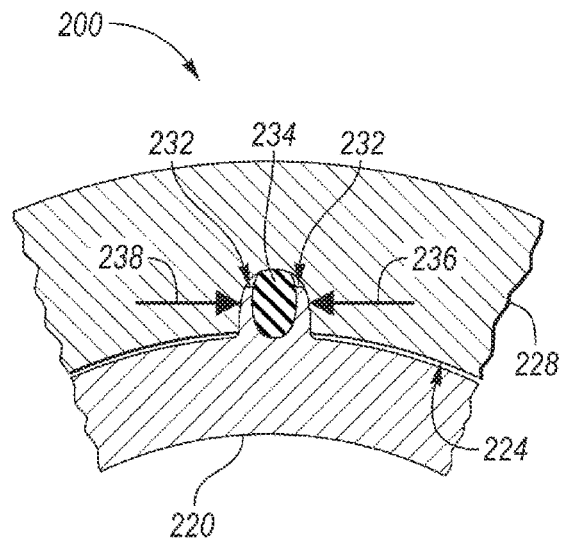
FIG. 2B is a cross section along line A-A through the first example stator and housing segment of FIG. 2A while fully assembled.

Referring collectively to FIG. 2A and FIG. 2B, a partial cross section 200 along line A-A of FIG. 1 depicts a stator to housing connection using a locking interference key example of a retention feature according to the present disclosure. While a single locking key is depicted by way of example, as discussed above a plurality of locking interference keys may be provided around the motor circumference. Moreover, the examples of FIG. 2A and FIG. 2B are not limited to connections between the stator and housing, but may be similarly applied to connections between the motor core and shaft.

FIG. 2A includes cross section 200 that depicts an initial state of assembly where a stator core 220 is inserted into a central opening 224 of a housing 228. Retention feature 226 extends radially from the stator core 220 and is shaped to slid into a channel 230 disposed on an inner wall of the central opening 224 of the housing 228. The retention feature 226 includes a pair of split prongs 232 that form a gap therebetween. During the first phase of assembly, the retention feature 226 includes clearance to the channel 230. In this way the stator core 220 may be loosely assembled to the housing 228 via longitudinal sliding without requiring excessive force or stress on the components. According to some examples, a plurality of retention features 226 are disposed along a length of stator core 220. In some more specific examples. A retention feature is disposed near each of two opposing longitudinal ends of stator core 220.

Referring to FIG. 2B, cross section 200 is depicted at a later state of assembly when the stator core 220 is firmly secured to housing 228. A retention key 234 is inserted into the gap formed between the pair of split prongs 232. The retention key 234 is oversized relative to a size of the gap during the initial state of assembly such that the key plastically deforms the prongs 232 circumferentially to compress against side walls of the channel 230. A reactive force schematically represented by arrows 236, 238 is generated to resists movement of the stator core 220 relative to the housing 228. According to some examples a single retention key 234 is inserted along a length of the stator core 220 to engage at least one retention feature. In other examples, a retention key is inserted at each of two opposing ends of the stator core to engage a retention feature disposed near the two opposing ends.

Figure 3:
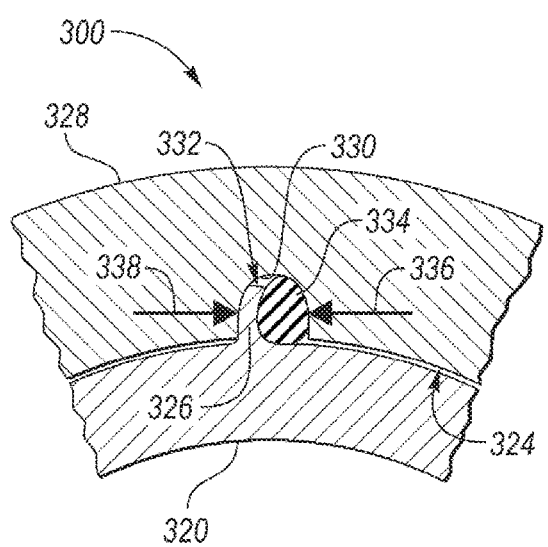
FIG. 3 is a cross section along line A-A through a second example stator and housing segment.

Referring to FIG. 3, cross section 300 represents another example retention feature. The cross section 300 corresponds to a later assembled state after the insertion of a retention key 334. In the example of FIG. 3, a stator core 320 is inserted into a central opening 324 of a housing 328 similar to previous examples. A retention feature 326 is provided to engage a channel 330 of the housing 328. In the example of FIG. 3, the retention feature 326 includes a single prong 332. Similar to previous examples, a retention key 334 is provided to cause a deformation of the prong 332. Once inserted, circumferential forces are created against an inner wall of the channel 330 to resist movement of the stator core 320 relative to the housing 328. In the example of FIG. 3, opposing forces represented by arrows 336, 338 are generated to prevent relative movement of the stator core 320. In the example of FIG. 3, the retention feature includes a prong abutted against a first inner wall of the channel 330 and the retention key abuts against an opposing second inner wall of the channel 330. Like previous examples, a single retention key 334 may be is inserted along a length of the stator core 320 to engage at least one retention feature. In other examples, multiple retention keys may be inserted from each of two opposing ends of the stator core to engage a retention feature disposed near the two opposing ends.

Figure 4:
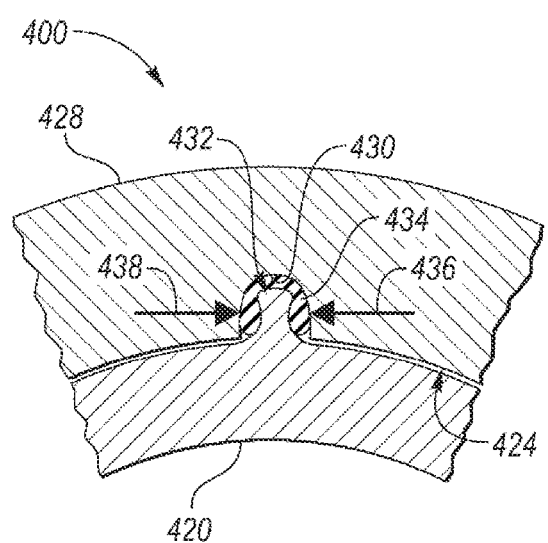
FIG. 4 is a cross section along line A-A through a third example stator and housing segment.

Referring to FIG. 4, cross section 400 represents a further example retention feature. The cross section 400 also corresponds to a later assembled state after the insertion of a retention key 434. In the example of FIG. 4, a stator core 420 is similarly inserted into a central opening 424 of a housing 428 much like previous examples. A retention feature 426 is provided to engage a channel 430 of the housing 428. In the example of FIG. 4, the retention feature 426 includes a single prong 432. Unlike previous examples, the prong 432 is centrally-located within the channel 430. A retention key 434 is inserted and includes retention portions disposed on opposing sides of the prong 432. Once inserted, circumferential forces are created against both opposing inner walls of the channel 430 to resist movement of the stator core 420 relative to the housing 428. In the example of FIG. 4, opposing forces represented by arrows 436, 438 are generated to prevent relative movement of the stator core 420. Like previous examples, a single retention key 434 may be is inserted along a length of the stator core 320 to engage at least one retention feature. In other examples, multiple retention keys may be inserted from each of two opposing ends of the stator core to engage a retention feature disposed near the two opposing ends.

With reference to each of the examples described herein including retention key configurations, it should be appreciated that a tapered lead-in shape may be employed to aid in assembly and reduce required assembly forces.

Figure 5A:
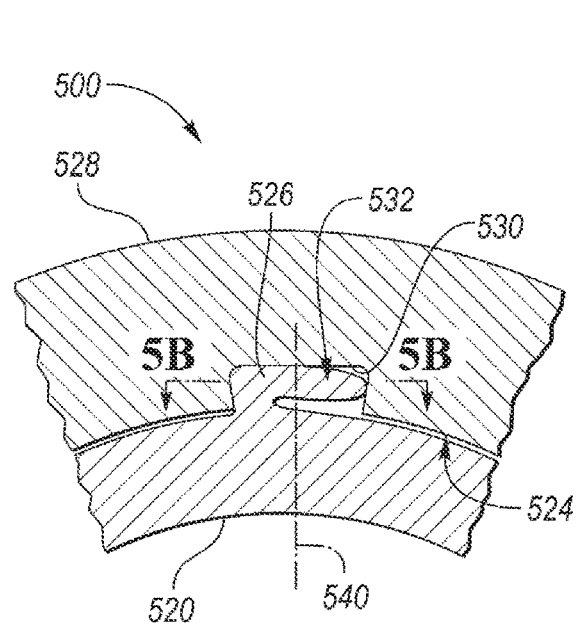
FIG. 5A is a cross section along line A-A through a fourth example stator and housing segment.
Figure 5B:
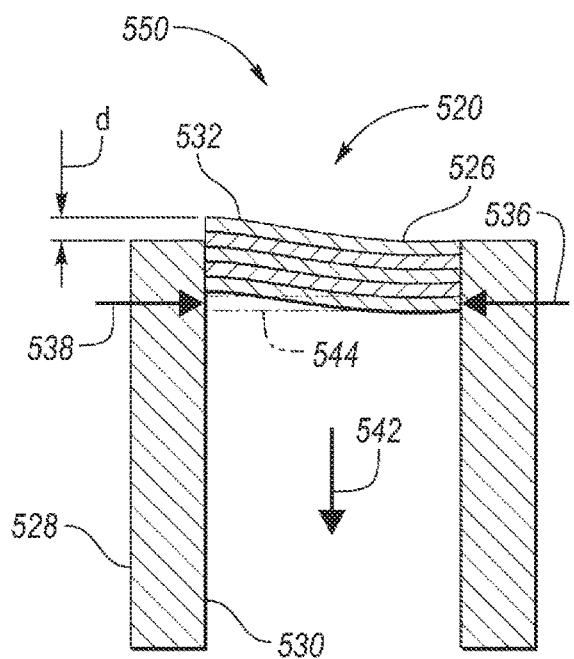
FIG. 5B is a cross section along line B-B through the fourth example stator and housing segment.

Referring collectively to FIG. 5A and FIG. 5B, a further example retention feature is provided that secures to a channel of a housing without the need for a retaining key. With specific reference to FIG. 5A, cross section 500 is oriented along a plane perpendicular to a longitudinal axis of an electric machine similar to the examples discussed above. Also much like previous examples, a stator core 520 is assembled by insertion into a central opening 524 of a housing 528. A retention feature 526 is provided to engage a channel 530 of the housing 528. Still referring to FIG. 5A, the retention feature 526 includes a circumferentially-extending prong 532. Unlike previous examples, the prong 532 is configured to engage opposing inner walls of channel 530. Since each laminate layer of the stator is relatively thin, the prong 532 deforms approximately about axis 540 during insertion.

Referring to FIG. 5B, cross section 550 is oriented along line B-B of FIG. 5A. The example cross section depicts a plurality of laminates of stator 520 assembled along a longitudinal assembly direction depicted by arrow 542. As the laminates of stator 520 are assembled, deflection of prong 532 of the retention feature 526 occurs in a direction opposing the assembly direction 542. Each prong 532 is configured to easily defect a distance d to effectively reduce its circumferential length during insertion thereby reducing the required insertion force required to slide the retention feature 526 into the housing 528. Once any of the laminates of the stator 520 are inserted to the desired longitudinal position along the housing 528, the direction of movement may be reversed to cause the retention feature to return to an undeflected position 544. That is, a reversal of movement may be caused to move each laminate in a direction opposing the assembly direction 542. The reversal of movement causes increased friction between a distal tip of the prong 532 and an inner wall of the channel 530. In this way, circumferential forces are generated against the inner wall of the channel 530 to resist movement of the stator core 520 relative to the housing 528. In the example of FIG. 5B, opposing forces represented by arrows 536, 538 are generated to prevent movement of the stator core 520 relative to the housing 528.

Any number of the plurality of laminates of stator 520 may include a retention feature 526 as exemplified by FIG. 5A and FIG. 5B. According to some examples, at least one laminate of the stator 520 located near opposing longitudinal ends of the housing includes one or more retention features. In this way, laminates located in longitudinally-central locations may be retained by laminates at the opposing longitudinal ends of the housing. In other examples, laminates of the stator having retention features are periodically interleaved along the full laminate stack.

Figure 6:
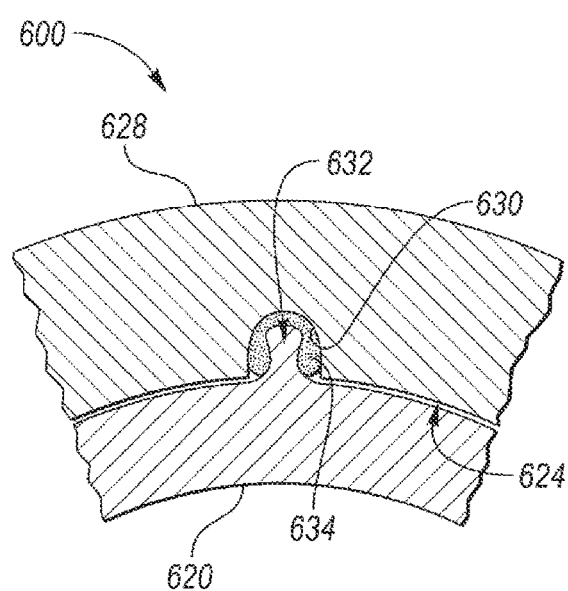
FIG. 6 is a cross section along line A-A through a fifth example stator and housing segment.

Referring to FIG. 6, cross section 600 depicts yet another example retention feature 626. Similar to examples discussed above, the retention feature 626 includes a prong 632 that is generally centrally-located within a channel 630 of the housing 628. That is, a gap is present during an initial state of assembly to reduce the required insertion force required to assemble the stator to the housing. Also similar to previous examples, a retention force is generated after the each laminate of stator 620 is positioned at its desired longitudinal position along the housing 628. However, unlike previous examples, a retention key 634 comprises a compliant material configured to increase stiffness and/or retention over time following insertion. According to some examples, the retention key 634 comprises a pump-able adhesive or foam that may be pumped into the channel 630 either before or after the assembly of stator 620. In other examples, the retention key 634 comprises a compliant polymer material. In more specific examples the polymer material includes time-hardening properties to firmly secure the stator relative to the housing. In some cases, the time-hardening is induced by the application of heat. Once the compliant retention key 634 is hardened, circumferential forces are generated against inner walls of the channel 630 to resist movement of the stator 620.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
   an outer housing;
   a stator secured to the outer housing and configured to induce an electromagnetic field;
   a rotor configured to output rotational movement in response to the electromagnetic field of the stator; and
   at least one retention key configured to cooperate with a retention feature of the stator to engage a channel of the outer housing to generate a circumferential force to resist movement of the stator relative to the outer housing, wherein the retention feature includes a prong abutted against a first inner wall of the channel and the retention key abuts against an opposing second inner wall of the channel.

2. The electric machine of claim 1 wherein the retention feature includes a pair of split prongs forming a gap therebetween and the retention key is inserted into the gap to generate the circumferential force.

3. The electric machine of claim 1 wherein the retention feature includes a prong generally centrally-located within the channel and the retention key is disposed on opposing sides of the prong to engage opposing inner walls of the channel thereby generating the circumferential force.

4. The electric machine of claim 1 wherein a retention key is inserted at each of two opposing longitudinal ends of the outer housing.

5. The electric machine of claim 1 wherein the retention key comprises a compliant material having time-hardening properties to generate the circumferential force after hardening.

6. An electric machine comprising:
   a rotor configured to output rotational movement in response to an electromagnetic field;
   a stator disposed about the rotor and configured to induce the electromagnetic field in response to a supplied power, the stator including at least one radially-extending retention feature;
   a housing configured to secure the stator, wherein the housing includes a channel to receive the at least one retention feature; and
   a retention key configured to cause the at least one retention feature to engage opposing side walls of the channel to restrict movement of the stator, wherein the retention key comprises a circumferentially-extending prong configured to longitudinally deflect during insertion of the stator into the housing in a first direction and return to a longitudinally undeflected position during movement in a second opposing direction.

7. The electric machine of claim 6 wherein the retention feature includes a pair of split prongs forming a gap therebetween and the retention key is inserted into the gap to generate a circumferential force.

8. The electric machine of claim 6 wherein the retention feature includes a prong generally centrally-located within the channel and the retention key is disposed on opposing sides of the prong to engage opposing inner walls of the channel thereby generating a circumferential force.

9. The electric machine of claim 6 wherein a retention key is inserted at each of two opposing longitudinal ends of the housing.

10. The electric machine of claim 6 wherein the retention key comprises a compliant material having time-hardening properties to generate a circumferential force after hardening.

\* \* \* \* \*